D. Bull.
Clothes Line Fastener.
Nº 95,316. Patented Sept. 28, 1869.
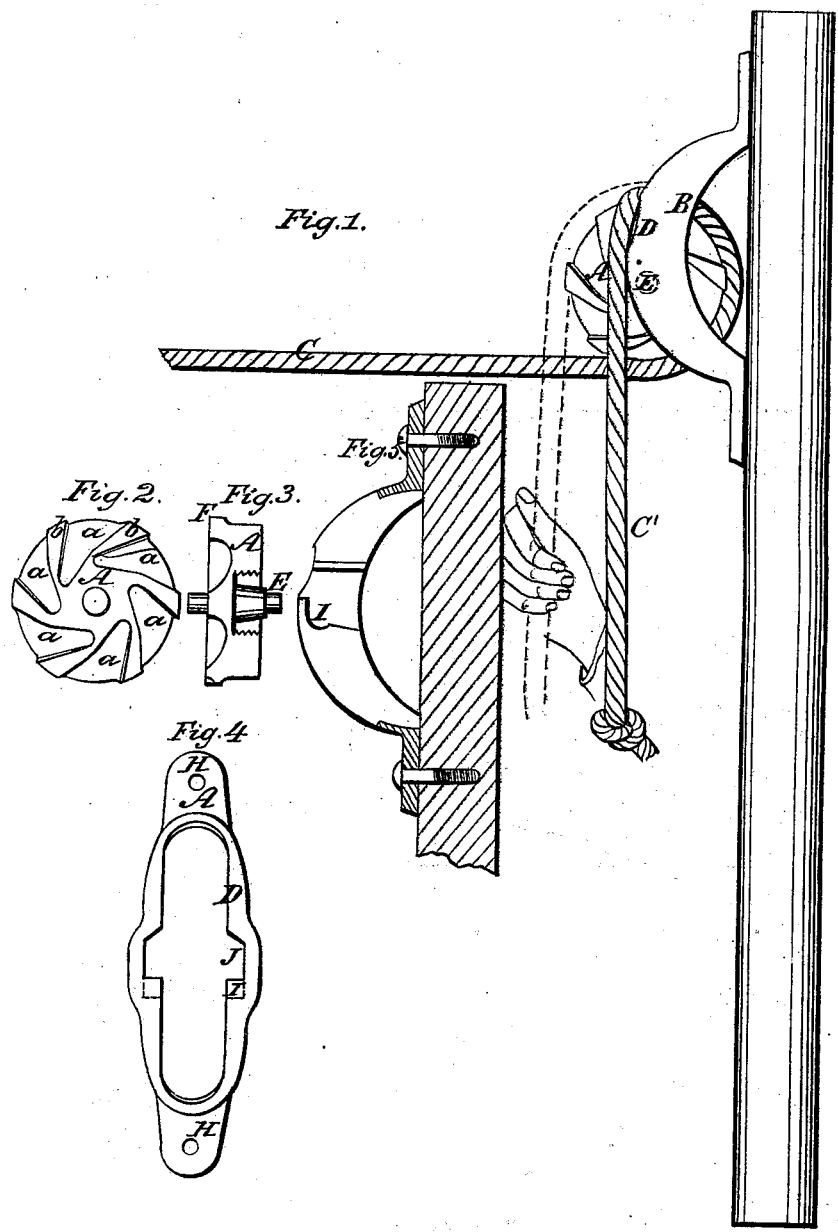
Witnesses.
J. M. Munday.
H. Bruns.
Inventor.
Daniel Bull
by Lewis L. Coburn
Atty.

UNITED STATES PATENT OFFICE.

DANIEL BULL, OF AMBOY, ILLINOIS.

IMPROVED CLOTHES-LINE HOLDER.

Specification forming part of Letters Patent No. 95,316, dated September 28, 1869.

*To all whom it may concern:*

Be it known that I, DANIEL BULL, of Amboy, in the county of Lee and State of Illinois, have invented certain Improvements in Clothes-Line Fasteners, of which the following is a specification.

My invention relates to a pulley around which may be passed the end of a clothes-line, or any other cord which it may be desirable to tighten and fasten by the same movement, or, at least, without resorting to a knot or tie.

It has for its object to furnish a cheap, durable, and very desirable fastening for a clothes-line or other cord.

In the accompanying drawings, Figure 1 is a side view of the pulley and line in operation. Fig. 2 is a side view of the pulley. Fig. 3 is a front view of the pulley. Fig. 4 is a front view of the pulley-hanger. Fig. 5 is a section of the pulley-hanger.

A is a pulley working in the pulley-hanger B. The axis E is made part of the pulley, and the hanger B is cut, as at J, so that it is easy to remove the pulley from its bearings I. One side of the pulley A is cut into a series of grooves or notches, $a$, which start near the center and widen toward the edge, running in lines nearly at a tangent to the axle-shafts. These grooves are hollowed out rounding, and are separated from each other by certain uncut portions, $b$, of the pulley-wheel. The pulley-wheel A is fastened up in the desired position by screws through the holes H. The clothes line or cord C C' is then passed around the pulley A, so that the end or fall will come over the top, as shown by the dotted line in Fig. 1. The line or cord is tightened by pulling while in this position. When it is sufficiently tight, the cord or line is brought back, as shown at C', when it falls into one of the grooves $a$, and is jammed firmly between the part D of the pulley-hanger and the uncut portion $b$ of the side of the pulley-wheel. Now, if the portion of the cord or line marked C is subjected to a pull or tension, it tends to turn the pulley-wheel, so as to press the cord all the more firmly between the wheel and hanger.

The cord or line may be loosened by an exact reversal of the above-described operation, and may be firmly held at any required degree of tension.

The use of a pulley, instead of the ordinary method of fastening by carrying the line around some fixed point and fastening by a block or lever, has the advantage of giving a better purchase with less friction, consequently less force is required to tighten the line.

I claim as my invention—

The pulley-wheel A, notched, as at $a$, combined with the hanger B, as and for the purpose above specified.

DANIEL BULL.

Witnesses:
CHAS. BRISTOL,
J. LITTTE.